Sept. 19, 1967 E. U. SOWERS, III 3,342,392

FLUID AMPLIFIER VACUUM CAPSTAN CONTROL

Filed June 9, 1965

INVENTOR
EDWIN U. SOWERS III

BY Griffin and Stokes

ATTORNEYS

United States Patent Office 3,342,392

Patented Sept. 19, 1967

3,342,392
FLUID AMPLIFIER VACUUM CAPSTAN CONTROL

Edwin U. Sowers III, Silver Spring, Md., assignor to Sperry Rand Corporation, New York, N.Y., a corporation of Delaware

Filed June 9, 1965, Ser. No. 462,502
15 Claims. (Cl. 226—95)

The present invention relates to means for providing rapid start-stop action of a tape drive capstan, and more particularly, is concerned with the utilization of a fluid amplifier to accomplish control.

Pneumatic tape drive capstans are well known in the prior art, wherein the magnitude and polarity of the differential pressure, or pressure gradient, across a magnetic tape or the like selectively forces said tape against or away from a moving member. A change in differential pressure is normally accomplished by the use of a mechanical valve which adjusts the internal pressure of a capstan relative to the environmental pressure, said internal pressure being communicated to the capstan surface by means of a series of ports. Mechanical valve elements, however, have a substantial amount of inertia due to their mass, so that switching between start and stop operations takes a finite amount of time. The problem of mechanical mass inertia can be overcome by the use of fluid amplifier techniques wherein no movable mechanical parts are necessary in order to vary the fluid pressure in one or more conduits. A fluid amplifier is here defined as including a configuration of input and output channels associated with a chamber whereby the direction of a fluid power stream can be diverted within said chamber by means of a deflecting force to any one of several output channels, herein called the active output channel, without losing its integrity. This switching of the power stream can occur quite rapidly.

In the so-called pure fluid amplifier, the deflecting force is provided by a fluid control stream which enters the chamber in a direction transverse to the power stream direction. The present invention employs the vacuum entrainment pressure created in the active output channel of a fluid amplifier to transmit a change in fluid pressure to one side of a tape so as to force it toward a moving capstan surface. Connections are also made to apply positive pressure to the tape in order to disengage it from the capstan. Novel capstan structure is further provided for use in a system of this nature. The system may also be expanded to include a stationary braking surface for the tape which is also operated by the same fluid amplifier in order to rapidly stop a moving tape once it has been forced away from the capstan surface.

Therefore, one object of the present invention is to provide web transport means which uses vacuum pressure created in an output channel of a fluid amplifier, by virtue of power stream flow therein, to change the pressure differential across the tape in the vicinity of a moving transport surface.

A further object of the present invention is to provide a web transport mechanism using a fluid amplifier in combination with a novel rotating capstan configuration.

Another object of the present invention is to provide web transport mechanism including braking means whose actuating means is a fluid amplifier.

These and other objects of the invention will be apparent during the course of the following description to be read in conjunction with the drawings, in which.

Figure 1:
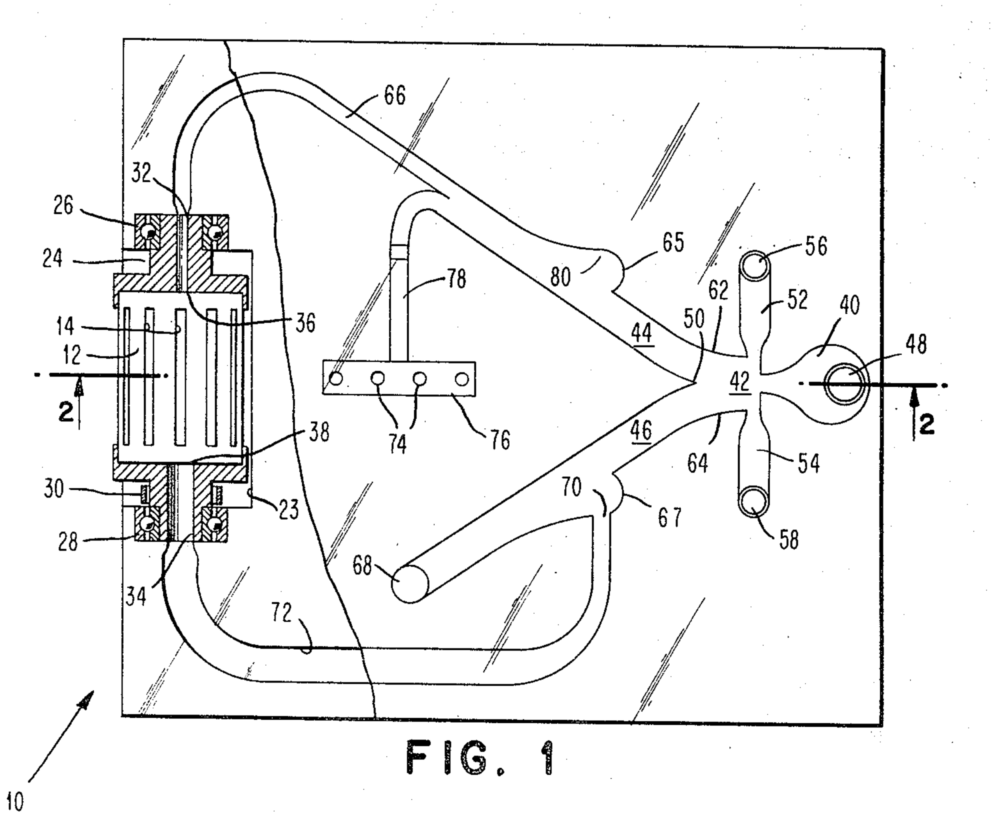
FIG. 1 is a plan view of the invention.
Figure 2:
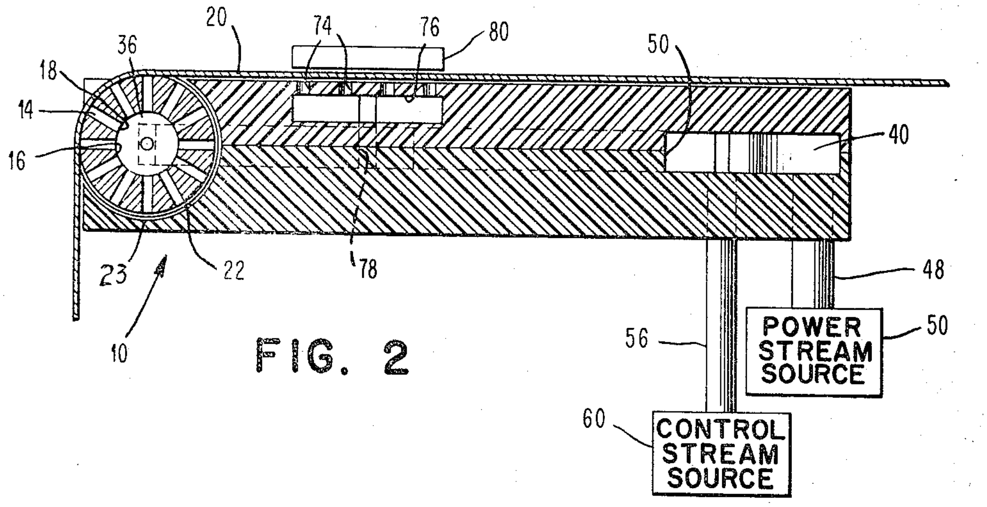
FIG. 2 is an elevation view of said invention.

Referring now to FIGURES 1 and 2, there is shown a preferred embodiment of the present invention. A body 10 has formed therein a plurality of interconnected fluid conduits subsequently to be described. Body 10 also provides a support for a rotatable capstan member 12. Capstan 12 in its preferred novel form takes the shape of a cylinder whose external peripheral surface contains a plurality of elongated ports 14 spaced thereabout in the direction of rotation. The interior of the capstan is hollow to thereby form a common manifold 16 which communicates with each of the ports 14 by means of bores 18. It will be seen that each port 14 extends axially of cylinder 12 for a length approximately equal to the width of a web or tape 20. Assuming that tape 20 is situated in an external fluid pressure environment such as the atmosphere, it can be selectively forced toward or away from rotating capstan 12 by selectively changing the manifold pressure so that it is lower or higher, respectively, than the environmental pressure. When the manifold pressure is lower, said pressure is communicated to the underside of tape 20 so that a pressure differential or gradient exists thereacross which forces tape 20 against capstan 12. On the other hand, if the manifold pressure is higher than the external environmental pressure, then the pressure differential existing across tape 20 is such as to force said tape away from the rotating surface.

In order to reduce excessive flow of fluid through ports 14 as well as to prevent undue pressure loss within manifold 16, FIGURE 2 shows block 10 being formed so that an imperforate surface or shroud 23 thereof partially surrounds the capstan peripheral surface, there being a minimum clearance 22 therebetween. Only a portion of the capstan surface is therefore exposed to the environment at any one time. This portion is the vicinity of the arc of tape-capstan contact. Thus, when a port 14 is rotated so that it comes opposite to the imperforate surface 23 of body 10, fluid is prevented from emanating therefrom or entering thereto. This novel structure thereby makes more efficient the system of operation because it reduces unwanted leakage.

Capstan 12 is rotated about its hub or shaft 24 which in turn is journalled in body 10 by means of bearings 26 and 28. A convenient way of rotating shaft 24 is by a belt 30 given a half-turn around one end of the shaft and driven by motor means not shown in the figures. Fluid conduits 32 and 34 are provided in shaft 24, each of which enters a manifold 16 by means of inlets 36 and 38, respectively.

The means whereby the manifold pressure may be varied is a pure fluid amplifier whose plan view is shown in FIG. 1. This comprises a power stream input channel 40, a fluid interaction chamber 42, and power stream output channels 44 and 46 which exit from chamber 42. These channels may be formed within block 10 if a unitary structure is desired. They have a rectangular cross-section in the preferred form, although this cross-section may be of different shape if so desired. Power stream fluid is introduced to channel 40 by means of a conduit 48 entering at right angles thereto, which in turn is supplied from an external power stream source 50 such as a pump or compressor. This fluid may be air or another gas, or a liquid such as water. However, since most tape capstans are employed in the atmospheric environment, the use of air as a working fluid is convenient since it can be exhausted directly back to the atmosphere without need for special return conduits to the suction side of the power stream source.

As best shown in FIGURE 1, power stream fluid in channel 40 exists therefrom into interaction chamber 42 whereupon it impinges upon a divider edge 50 which is formed by the junction of the two output channels 44 and 46. As is well known in the prior art, the power stream can be deflected without losing its integrity so that more or less of its fluid flows into a particular one of the output channels. In a pure fluid amplifier, this power stream deflection is accomplished by a control stream which impinges thereon at substantially a right angle. Amplification occurs because the power stream is of higher energy than is the control stream. In FIGURE 1, two opposed control stream input channels 52 and 54 are provided, each of which is supplied from a separate external source via conduits 56 and 58, respectively. If the control stream source 60 supplies fluid to channel 52, the emergence of said fluid into interaction chamber 42 impinges upon the power stream from channel 40 in order to divert the latter toward output channel 46. Where the channel dimensions and fluid pressures are such that the amount of power stream fluid in channel 46 is proportional to the amount of control stream fluid in channel 52, power stream deflection remains only so long as there is control fluid supplied by source 60. However, it is preferred in tape capstan operation that a digital type fluid amplifier be employed wherein the power stream can be completely switched from one output channel to the other upon initiation of the control input signal, and further than the power stream subsequently remain flowing in the selected output channel even after termination of the control signal. This latter function requires that the fluid amplifier be bistable. Although there are several ways of providing this feature in a fluid amplifier, one preferred method is by use of the boundary layer phenomenon. As is well recognized in the prior art, the boundary layer effect occurs when a fluid stream approaches the side wall of a channel and entrains fluid such that the pressure therebetween is reduced below the pressure existing on the opposite side of the stream. This pressure differential if large enough causes the fluid stream to "lock on" to the side wall in stable fashion. In FIGURE 1, this boundary layer effect is created and/or enhanced by making the outer side walls 62 and 64 of the interaction chamber offset with respect to the nozzle of power stream channel 40. Consequently, when once the power stream has been deflected toward channel 46 by a control stream in channel 52, said power stream locks on to side wall 64 and flows entirely through said channel 46 even after the control signal from source 60 is terminated. A similar effect occurs when control stream fluid is directed through channel 54 since the power stream is deflected away from channel 46 towards channel 44, whereupon it locks on to wall 62 and there remains until a control stream is once again introduced into channel 52. These control signals may be generated from transducer means which in turn are supplied with electrical or other non-fluid signals. The initial deflection of the power stream in the chamber of a fluid amplifier can also be accomplished by movable mechanical parts, although the use of said parts in the present invention may reduce the response time of the system below that possible with the use of fluid control signals.

As best shown in FIGURE 1, output channel 44 of the fluid amplifier has a downstream outlet connected via a conduit 66 to conduit 32 of capstan 12. Power stream flow in channel 44 is such as to increase the pressure within manifold 16 to a value above the environmental pressure acting upon the outer side of tape 20. This higher manifold pressure is communicated through bores 18 to the inner side of tape 20 whereupon the tape becomes disengaged from the capstan surface and no longer has capstan rotational energy transferred thereto. If power stream flow instead occurs in output channel 46, it exits therefrom through an exhaust channel 68 into the atmosphere. It will be noted that the outer sidewall of channel 46 is constructed with a cusp-like region 67. This wall set back region 67 contains a body of fluid whose molecules are drawn or extracted therefrom into the power stream fluid flowing through channel 46. The dimensions of channel 46 and the velocity of the power stream flow therein are such that the fluid pressure at said cusp region 67 is reduced, by virtue of the entrainment of fluid therefrom by the moving power stream, to a value lower than the external environmental pressure. A static pressure tap hole 70 is provided in the side wall of channel 46 at cusp region 67 in order to communicate this lower, or vacuum, pressure via conduit 72 to conduit 34 and thence to manifold 16 so that tape 20 is positively forced into engagement with the rotating capstan. Thus, the lower than atmospheric pressure actually communicated to the capstan structure is seen to originate within an output channel of the fluid amplifier in which the power stream is actively flowing. Furthermore, since at no time does power stream fluid actually enter channel 72 (because of the substantially transverse orientation of its inlet with respect to the power fluid velocity direction), the pressure therein is immediately responsive to a change in the power stream flow condition within channel 46. This makes for an extremely rapid change in the tape operating condition.

A further feature of the invention is the provision of braking structure for positively gripping tape 20 whenever said tape is forced away from capstan 12. At least part of this structure may be incorporated in unitary body 10 by providing in its surface adjacent the tape path a plurality of ports 74 spaced apart in the direction of tape motion and in communication with a manifold chamber 76. A brake shoe member 80 is positioned adjacent to the upper side of tape 20 and opposite ports 74 on the surface of body 10. The object is to increase the pressure in manifold 76 to a value greater than atmospheric pressure so as to force tape 20 against the surface of brake shoe member 80 whenever tape motion is to cease. In the absence of such higher pressure in manifold 76, tape 20 drops away from member 80 by virtue of its own weight. A conduit 78 is taken from the downstream outlet of channel 44 and is connected to manifold 76 so that a portion of the power stream in channel 44 can be directed to accomplish this function. In operation, power stream flow in channel 44 is divided between manifold 16 of capstan 12 and manifold 76 of the brake. The pressure thus produced in each is greater than atmospheric so that tape 20 is forced against brake shoe 80 and also is forced away from rotating capstan 12.

It will further be noted that the cross sectional flow area of conduit 32 is preferably substantially less than the flow area of conduit 34. Furthermore, channel 78 at its termination in manifold 76 is also seen to be preferably larger than conduit 32. The conduit 32 impedance or resistance to fluid flow is therefore larger than the fluid resistance presented by either conduit 34 or channel 78. This means that when the power stream flows through channel 46, a greater capstan wheel vacuum can be produced in manifold 16 because the smaller conduit 32 cannot supply fluid to manifold 16 as fast as it is being extracted by conduit 34. When power stream flow is switched to channel 44, the smaller conduit 32 serves to direct more flow to brake manifold 76 as is desirable for the optimum braking effect, but still permits some power stream flow into manifold 16 to produce a degree of separation of the tape from the drive capstan.

Although a preferred embodiment of the invention has been shown, many modifications can be made thereto by persons skilled in the art without departing from the novel principles defined in the appended claims.

The embodiments of the invention in which an exclusive property or privilege is claimed are defined as follows:

1. A transfer device for selectively imparting motion to a web situated in a fluid pressure environment, which comprises:

(a) capstan member means having a movable surface portion adjacent the web and adapted to selectively grasp or release said web according to the presence of a respective first or second polarity fluid pressure differential thereacross;

(b) first means located in proximity to both said web and said capstan movable surface portion which is adapted to receive fluid pressure of either a first or second magnitude and communicate same to said web for respectively providing said first or second polarity fluid pressure differential thereacross; and (c) a digital type fluid amplifier having a power stream input channel, a first power stream output channel with a fluid entrainment offset region, a first fluid channel conected between said offset region and said first means, a second power stream ouput channel with a dyamic flow outlet, a second fluid channel connected between said flow outlet and said first means, and control signal input means for selectively diverting the power stream to either said first or said second power stream output channel such that a particular one of said first and second magnitude fluid pressures appears in said first fluid channel when power stream flow is through said first power stream output channel, and the other of said first and second magnitude fluid pressures appears in said second fluid channel when power stream flow is through said second power stream output channel.

2. A transfer device according to claim 1 wherein said first means is located on the same side of said web as is said capstan member movable surface portion.

3. A transfer device according to claim 1 wherein said fluid amplifier is bistable.

4. A transfer device according to claim 1 wherein said control signal input means comprises at least one control stream input channel.

5. A transfer device according to claim 1 wherein said capstan member means comprises a rotatable capstan having less than half of its exterior surface periphery adjacent to said web, and a stationary shroud member having an imperforate surface which surrounds the remainder of said capstan exterior surface periphery, where said capstan exterior surface periphery has a plurality of ports spaced completely thereabout in its direction of rotation; and said first means comprises a manifold chamber located within said capstan member together with a pluraliy of bores respectively connecting each said capstan surface port with said manifold chamber.

6. A transfer device according to claim 5 wherein said manifold chamber has first and second inlets located at opposite ends of the axis of capstan member rotation, with said first fluid channel being connected with said first inlet and said second fluid channel being connected with said second inlet.

7. A transfer device for selectively imparting motion to a web situated in a fluid pressure environment, which comprises:

(a) capstan member means having a movable surface portion adjacent the web and adapted to selectively grasp or release said web according to the presence of a respective first or second polarity fluid pressure differential thereacross;

(b) first means located in proximity to both said web and said capstan movable surface portion which is adapted to receive fluid pressure of either a first or a second magnitude and communicate same to said web for respectively providing said first or second polarity fluid pressure differential thereacross;

(c) stationary brake shoe member means having a surface portion adjacent said web and adapted to selectively grasp or release said web according to the presence of a respective third or fourth polarity fluid pressure differential thereacross;

(d) second means located in proximity to both said web and said brake member surface portion which is adapted to receive fluid pressure of either third or fourth magnitude and communicate same to said web for respectively providing said third or fourth polarity fluid pressure differential thereacross;

(e) a digital type fluid amplifier having a power stream input channel, a first power stream output channel with a fluid entrainment offset region, a first fluid channel connected between said offset region and said first means, a second power stream output channel with a first dynamic flow outlet, a second fluid channel connected between said first flow outlet and said first means, and control signal input means for selectively diverting the power stream to either said first or said second power stream output channel such that a particular one of said first and second magnitude fluid pressures appears in said first fluid channel when power stream flow is through said first power stream output channel, and the other of said first and second magnitude fluid pressures appears in said second fluid channel when power stream flow is through said second power stream output channel; and (f) a third channel connected between said second power stream output channel and said second means such that said third magnitude fluid pressure is applied to said second means while said second magnitude fluid pressure is applied to said first means, and said fourth magnitude fluid pressure is applied to said second means while said first magnitude fluid pressure is applied to said first means.

8. A transfer device according to claim 7 wherein said first means is located on the same side of said web as said capstan member movable surface.

9. A transfer device according to claim 7 wherein said second power stream output channel has a second dynamic flow outlet to which said third channel is connected.

10. A transfer device according to claim 7 wherein said capstan member means comprises a rotatable capstan having less than half of its exterior surface periphery adjacent to said web, and a stationary shroud member having an imperforate surface which surrounds the remainder of said capstan exterior surface periphery, where said capstan exterior surface periphery has a plurality of ports spaced completely thereabout in its direction of rotation; and said first means comprises a manifold chamber located within said capstan member together with a plurality of bores respectively connecting each said capstan surface port with said manifold chamber.

11. A transfer device according to claim 10 wherein said manifold chamber has first and second inlets located at opposite ends of the axis of capstan member rotation, with said first fluid channel being connected with said first inlet and said second fluid channel being connected with said second inlet.

12. A transfer device for selectively imparting motion to a web situated in a fluid pressure environment, which comprises:

(a) capstan member means having a movable surface portion with at least one port therein adjacent the web and adapted to selectively grasp or release said web according to the presence of a respective first or second polarity fluid pressure differential thereacross;

(b) first means adapted to receive fluid pressure of either a first or second magnitude and communicate same to said web via said movable surface portion port for respectively providing said first or second polarity fluid pressure differential thereacross;

(c) stationary brake shoe member means having a surface portion adjacent said web and adapted to selectively grasp or release said web according to the presence of a respective third or fourth polarity fluid pressure differential thereacross;

(d) second means adjacent to the opposite side of said web from said stationary brake shoe member means and which is adapted to receive fluid pressure of either a third or fourth magnitude and communicate same to said web for respectively providing said third or fourth fluid pressure differential thereacross; and (e) a digital type fluid amplifier having a power stream input channel, a first power stream output channel with a fluid entrainment offset region, a first fluid channel connected between said offset region and said first means, a second power stream output channel with first and second dynamic flow outlets, a second fluid channel connected between said first flow outlet and said first means, a third fluid channel connected between said second flow outlet and said second means, and control signal input means for selectively diverting the power stream to either said first or said second power stream output channel.

13. A transfer device according to claim 12 wherein the fluid resistance of said second fluid channel is greater than the fluid resistance of said first fluid channel.

14. A transfer device according to claim 12 wherein the fluid resistance of said second fluid channel is greater than the fluid resistance of said third fluid channel.

15. A transfer device according to claim 14 wherein the fluid resistance of said second fluid channel is greater than the fluid resistance of said first fluid channel.

References Cited

UNITED STATES PATENTS

| | | | |
|---|---|---|---|
| 2,852,253 | 9/1958 | Pouliart et al. | 226—95 |
| 3,016,063 | 1/1962 | Hausmann | 137—81.5 |
| 3,075,679 | 1/1963 | Wadey | 137—81.5 X |
| 3,171,422 | 3/1965 | Evans | 137—81.5 |
| 3,219,048 | 11/1965 | Polmisano | 137—81.5 |
| 3,236,517 | 2/1966 | Lyman | 137—81.5 X |
| 3,270,932 | 9/1966 | Smith | 137—81.5 |
| 3,299,906 | 1/1967 | Smith et al. | 226—95 X |

M. CARY NELSON, *Primary Examiner.*

SAMUEL SCOTT, *Assistant Examiner.*